United States Patent
Bharatia et al.

(10) Patent No.: US 8,229,389 B2
(45) Date of Patent: Jul. 24, 2012

(54) METHOD FOR OBTAINING LOCATION INFORMATION FOR EMERGENCY SERVICES IN WIRELESS MULTIMEDIA NETWORKS

(75) Inventors: Jayshree Bharatia, Plano, TX (US);
Sonia Garapaty, Frisco, TX (US);
Amarjit Deol, Plano, TX (US)

(73) Assignee: Apple Inc., Cupertino, CA (US)

( * ) Notice: Subject to any disclaimer, the term of this patent is extended or adjusted under 35 U.S.C. 154(b) by 824 days.

(21) Appl. No.: 10/575,999

(22) PCT Filed: Oct. 11, 2004

(86) PCT No.: PCT/IB2004/003325
§ 371 (c)(1),
(2), (4) Date: Apr. 17, 2006

(87) PCT Pub. No.: WO2005/039227
PCT Pub. Date: Apr. 28, 2005

(65) Prior Publication Data
US 2007/0066277 A1    Mar. 22, 2007

(51) Int. Cl.
*H04M 11/04* (2006.01)
(52) U.S. Cl. ............... 455/404.1; 455/404.2; 455/456.1; 455/456.2
(58) Field of Classification Search ............... 455/404.1, 455/456.1, 456.2, 456.3
See application file for complete search history.

(56) References Cited

U.S. PATENT DOCUMENTS

| | | | | |
|---|---|---|---|---|
| 7,286,520 | B2* | 10/2007 | Takeda et al. | 370/349 |
| 2002/0042277 | A1* | 4/2002 | Smith | 455/456 |
| 2003/0087648 | A1* | 5/2003 | Mezhvinsky et al. | 455/456 |
| 2006/0195565 | A1* | 8/2006 | De-Poorter | 709/224 |
| 2007/0097967 | A1* | 5/2007 | Kauppinen et al. | 370/389 |
| 2010/0067444 | A1* | 3/2010 | Faccin et al. | 370/328 |

FOREIGN PATENT DOCUMENTS

| | | |
|---|---|---|
| EP | 1 248 484 A1 | 10/2002 |
| WO | WO 01/43395 A1 | 6/2001 |
| WO | WO 02/03718 | 1/2002 |
| WO | WO 02/33897 | 4/2002 |
| WO | WO 03/009627 A1 | 1/2003 |

OTHER PUBLICATIONS

Jose Costa-Requena et al., "Enhancing SIP with Spatial Location for Emergency Call Services", Proceedings of the 10th International Conference on Computer Communications and Networks, Oct. 15-17, 2001, IEEE, pp. 326-333.
Jose Costa-Requena et al., "Consistent LBS Solution in Next Generations of Mobile Internet", Proceedings of the Ninth International Conference on Parallel and Distributed Systems, 2002, IEEE, pp. 637-642.
Melody Moh et al., "Mobile IP Telephony: Mobility Support of SIP", Proceedings of the International Conference on Computer Communications and Networks, Oct. 11, 1999, IEEE, pp. 554-559.

* cited by examiner

*Primary Examiner* — Rafael Pérez-Gutiérrez
*Assistant Examiner* — German Viana Di Prisco
(74) *Attorney, Agent, or Firm* — Meyertons, Hood, Kivlin, Kowert & Goetzel, P.C.

(57) ABSTRACT

In accordance with the teachings of the present invention, a method and apparatus for obtaining end-user location information for emergency services within a multimedia network is presented. The multimedia network may include a network implementing the Session Initiation Protocol, H.323, etc. In one embodiment, a Location Application Server (LAS) in the multimedia network and an interface between the LAS and a gateway mobile location center (GMLC) is defined.

14 Claims, 5 Drawing Sheets

METHOD FOR OBTAINING LOCATION INFORMATION FOR EMERGENCY SERVICES IN WIRELESS MULTIMEDIA NETWORKS

BACKGROUND OF THE INVENTION

1. Field of the Invention

This invention relates to communications. Specifically, communication of an emergency request.

2. Description of the Prior Art

Communications networks are becoming ubiquitous. The lines that once differentiated voice networks, data networks and video networks are blurring. In addition, wireless networks and terrestrial networks such as circuit-switched networks and packet-switched networks are often integrated.

Currently there are substantial wireless networks in North America, Europe, Asia and other parts of the world. These wireless networks are often based on communications standards. For example, Second-Generation Wireless Network (2G) standards and Third-Generation Wireless Network (3G) standards are currently being deployed. Some of the more recent standards provide for multimedia traffic such as voice and data traffic across these networks.

Circuit-switched and packet-switched networks have also advanced to provide more capability and functionality such as multimedia functionality. In addition, standards based protocols such as H.323 and Session Initiation Protocol (SIP) are currently being deployed to integrate multimedia functionality across terrestrial networks, such as packet-switched networks.

Given the need for ubiquitous communications, methods have developed for providing multi-media capability across wireless, packet-switched and circuit-switched networks. In order to properly integrate the networks, the services offered in any aspect of the network must be properly managed in other parts of the network. Some services currently being offered in the circuit-switched and packet-switched network also need to be supported in the multimedia network.

One specific service that is currently offered in wireless networks is an emergency service. The emergency service enables the ability to obtain the location of a wireless end user device and provide that location to the emergency service provider. Thus, there is a need for a method and apparatus for obtaining location information for emergency services within a multimedia network.

SUMMARY OF THE INVENTION

A method and apparatus is presented that obtains wireless end-user location information for emergency services within a multimedia network. In one embodiment, end-user location information is obtained within a multimedia network at session initiation. In a second embodiment, end user location information is obtained within a multimedia network after session initiation. In order to accomplish the foregoing methods, in one embodiment of the present invention, an application server, such as a Location Application Server (LAS) is implemented in a multimedia network. In accordance with the teachings of the present invention, an interface (i.e., herein referred to as an M1 interface) is defined to enable communication between the LAS and a Gateway Mobile Location Center (GMLC).

In accordance with the teaching of the present invention, a multimedia architecture is defined. In one embodiment, the multimedia architecture includes user equipment (UE), a Proxy-CSCF (P-CSCF), a Server-CSCF (S-CSCF), a LAS and a GMLC. Two methods of operating the multimedia architecture are defined. In one embodiment, location information is acquired at session initiation. In a second embodiment, location information is acquired after session initiation.

At session initiation, a UE sends an emergency request (e.g., INVITE) to a P-CSCF. The P-CSCF forwards the emergency request to a S-CSCF. On receipt of an emergency request (e.g., INVITE) the S-CSCF forwards the request to the LAS. The LAS sends a location request to the GMLC via an M1 interface. The GMLC initiates a Mobile Terminating Location Request (MT-LR) procedure to determine the UE's location information. The location information is returned to the LAS and then to the S-CSCF. The S-CSCF includes the location information in the emergency request (e.g., INVITE) and communicates the emergency request (e.g., INVITE message) to an EC.

After session initiation, a UE sends an emergency request (e.g., INVITE) to a P-CSCF. The P-CSCF forwards the emergency request to a S-CSCF. On receipt of an emergency request (e.g., INVITE) the S-CSCF forwards the request to the LAS. The LAS sends a request for routing information to the GMLC via an M1 interface. The GMLC sends an acknowledgement including routing information that will enable the EC to request the UE location at a later time (e.g. a routing key). At any time after receiving the request for routing information, the GMLC initiates a Mobile Terminating Location Request (MT-LR) procedure to determine the UE's location information. Upon receipt of the emergency request (e.g., INVITE message), the EC can request location information from the GMLC by using the routing information obtained in the emergency request (e.g., INVITE message).

DESCRIPTION OF THE INVENTION

Figure 1:
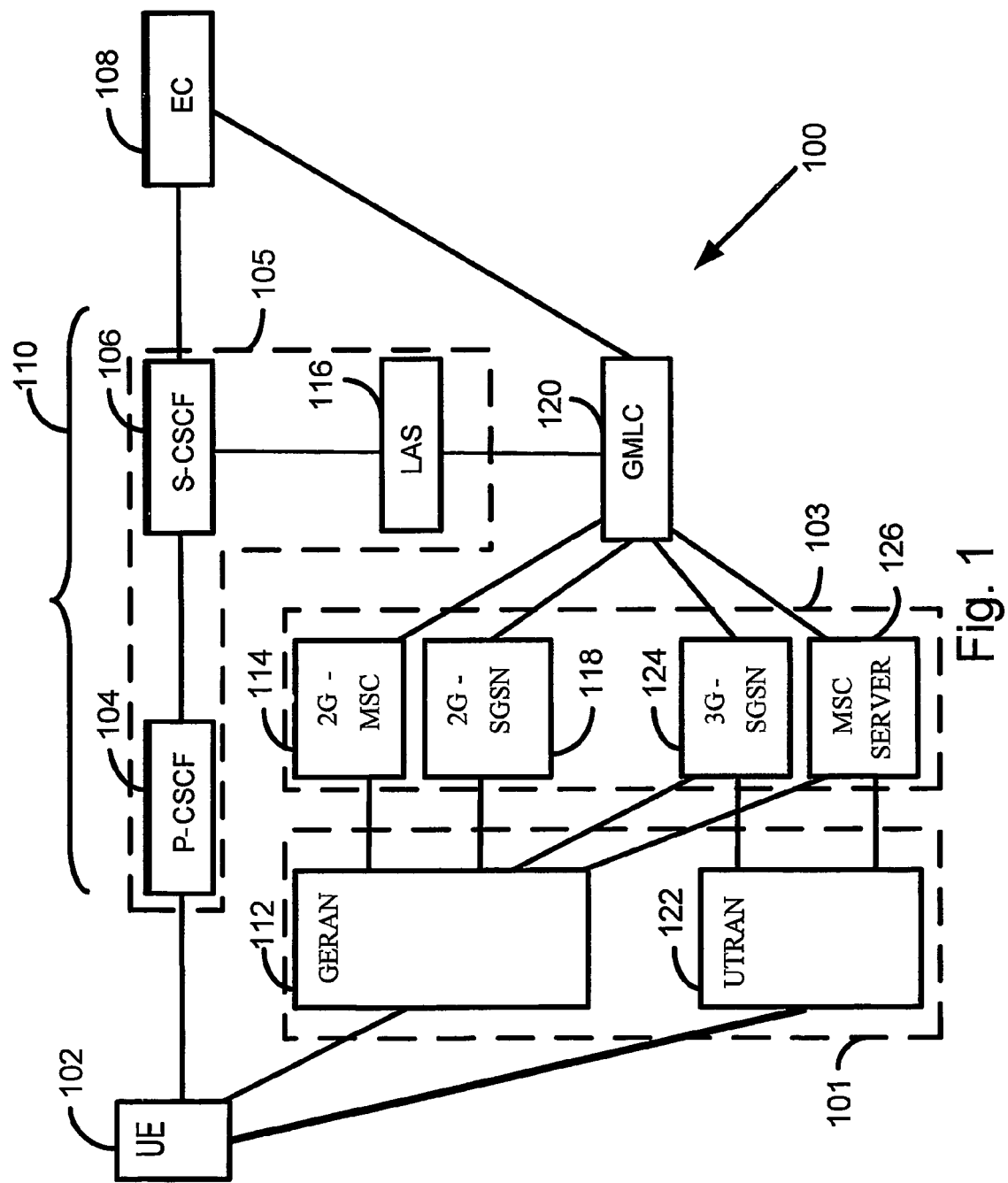
FIG. 1 displays a wireless IP multimedia (IMS) network implementing the teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In one embodiment of the present invention, a multimedia network is defined. The multimedia network includes a Location Application Server (LAS). In one embodiment, the LAS is an implementation of an Application Server specifically for location services. In accordance with the teachings of the present invention, a communication interface, referred to as an M1 interface is defined between the LAS and a Gateway Mobile Location Center (GMLC). The M1 interface enables communication between the LAS and the GMLC. As such, location information associated with User Equipment (UE)

may be communicated to an Emergency Center (EC) using the multimedia network. In one embodiment, the GMLC provides the functionality required to support location services and is positioned in a location services network.

The method and apparatus of the present invention are in compliance and may implement various features and concepts from 3GPP TS 23.002; 3GPP TS 23.060; 3GPP TS 23.228; 3GPP TS23.003; and 3GPP TS 23.271, which are each herein incorporated by reference. It should be appreciated that while specific references have been identified, the invention is not limited to the cited references.

A multimedia network architecture is defined. In one embodiment, the multimedia network architecture operates using the Session Initiation Protocol (SIP) as defined in Internet Engineering Task Force (IETF) RFC 3261 (June 2002), which is herein incorporated by reference. However, it should be appreciated that the multimedia network architecture may be implemented with a variety of competing technologies such as H.323 as defined in the International Telecommunications Union (ITU), version 7, approved Jul. 7, 2003. In one embodiment, the multimedia network architecture includes a Call Session Control Function (CSCF) and Application Server (AS). The CSCF may be implemented as a Proxy-CSCF (P-CSCF) and/or a Server-CSCF (S-CSCF). The P-CSCF communicates information from the UE to the S-CSCF. The S-CSCF communicates with the EC and with the AS.

In accordance with the teachings of the present invention, a method and apparatus is implemented for obtaining a wireless end user's location information for emergency services within a multimedia network. A Location Application Server (LAS) is implemented in the multimedia network. In accordance with the teaching of the present invention, an M1 interface is defined between the LAS and a GMLC to obtain the wireless end user's location information in the multimedia network. The M1 interface enables communication between the LAS and GMLC. In one embodiment, multimedia protocols such as Session Initiation Protocol (SIP) and H.323 are implemented in the multimedia network to facilitate acquisition of the wireless end user's location information. In one embodiment, the location information is obtained at session initiation. In a second embodiment, the location information is obtained after session initiation. Each method may be initiated based on when the location information is requested.

FIG. 1 displays a communication network implemented in accordance with the teachings of the present invention. In FIG. 1 User Equipment (UE) is shown as 102. In one embodiment, UE 102 is implemented to detect an emergency service request and to indicate the emergency service request to a network. The UE 102 communicates with access networks 101 as well as an multimedia network 105. For example, the UE 102 communicates with a GSM Edge Radio Access Network (GERAN) 112 and a Universal Terrestrial Radio Access Network (UTRAN) 122. In one embodiment, the GERAN 112, and the UTRAN 122 are implemented as access subsystems to access a core network 103.

The GERAN 112 communicates through core network 105 using a Second-Generation Message Switching Center (2G-MSC) 114 and/or a Second-Generation Serving GPRS Support Node (2G-SGSN) to a Gateway Mobile Location Center (GMLC) 120. The UTRAN 122 communicates through core network 105 using a Third-Generation Serving GPRS Support Node (3G-SGSN) 124 and/or a MSC server 126 to the GMLC.

In accordance with the teachings of the present invention, the UE 102 is capable of communication with an multimedia network 105. In one embodiment, the multimedia network 105 is implemented as an IP Multimedia Core Network Subsystem (IMS) network compliant with 3GPP TS 23.228 v6.5.0 (2004-03), which is herein incorporated by reference. In one embodiment of the present invention the IMS network 105 includes a Proxy CSCF (P-CSCF), Serving CSCF (S-CSCF) and Location Application Server (LAS) 116.

In FIG. 1, the UE 102 communicates with a P-CSCF 104, which communicates with a S-CSCF 106. The S-CSCF 106 communicates with a Location Application Server (LAS) 116. The LAS 116 communicates across an M1 interface with a GMLC 120. In one embodiment, the P-CSCF 104 functions as a proxy by accepting request, services the request and/or forwards the request for servicing. The P-CSCF 104 may function as a user agent terminating and independently generating transactions such as SIP transactions. In one embodiment, the S-CSCF 106 manages session states as necessary to support services operating in the network. In one embodiment, the LAS 116 receives emergency session establishment request from the S-CSCF 106, sends location and routing information request to the GMLC 120 and on receipt of location and/or routing information, the LAS 116 forwards the location and/or routing information to the S-CSCF 106. The S-CSCF 106 then forwards the location and/or routing information to the EC 108. In the scenario where routing information is forwarded to the EC 108, the EC 108 may the access the GMLC 120 to access the location information.

Figure 2:
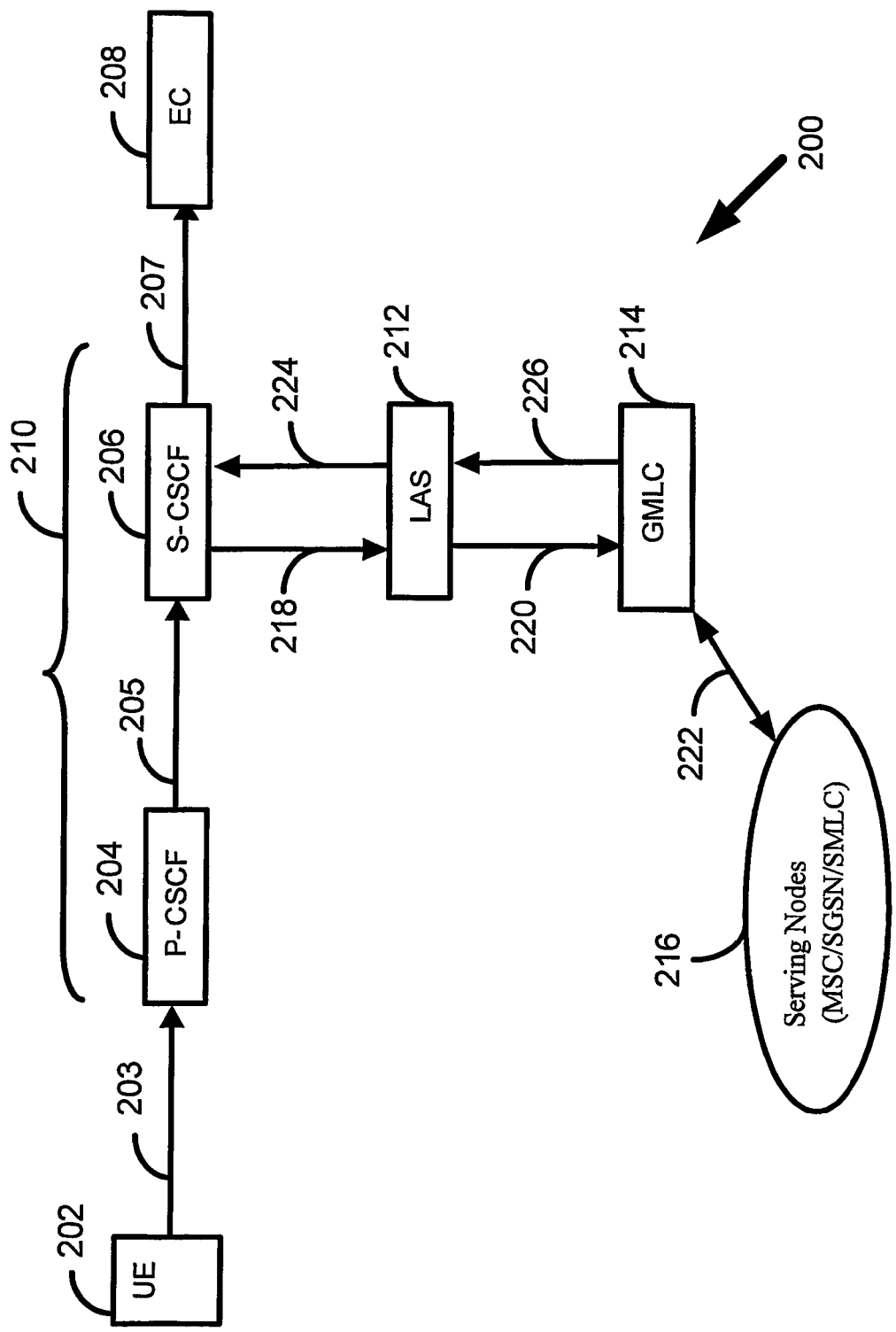
FIG. 2 displays a network implementing the method of acquiring location information at session initiation.

FIG. 2 displays a network implementing a method of obtaining location information at session initiation. A UE 202 communicates with a P-CSCF 204. The P-CSCF 204 is capable of communication with an S-CSCF 206. The S-SCSF 206 communicates with the EC 208 and the LAS 212. In accordance with the teachings of the present invention, the LAS 212 is capable of communication with the GMLC 214 using a defined M1 interface. The GMLC 214 is ultimately in communication with the serving nodes (MSC/SGSN/SMLC) 216.

During operation, an INVITE request 203 is sent from the UE 202 to the P-CSCF 204. The P-CSCF 204 detects that the user is initiating an emergency call and forwards the INVITE request 205 to a S-CSCF 206 in the same network 210. In accordance with the teachings of the present invention, the S-CSCF 206 detects this is an emergency call and forwards the INVITE request 218 to the LAS 212. A Location Request 220 is sent from the LAS 212 to a GMLC in the same network 214. In one embodiment, the location request 220 may be an immediate location request or a deferred location request.

The GMLC 214 sends a Location Service (LCS) Mobile Terminal Location Request (MT-LR) 222 to the server nodes 216. In one embodiment, the MT-LR procedures are implemented in accordance with the MT-LR procedures described in 3GPP TS 23.271 V6.7.0 (2004-03), which is herein incorporated by reference. The server nodes 216 communicate a response including the location information of the user to the GMLC 224 (as shown by the two-directional arrow 222). The GMLC 214 communicates a Location Response 326 including the location information of the user to the LAS 212. The LAS 212 communicates an INVITE message 224 including the received location information of the user to the S-CSCF 206. The S-CSCF 206 then forwards the INVITE message 207 including the location information of the user to the EC 208.

Figure 3:
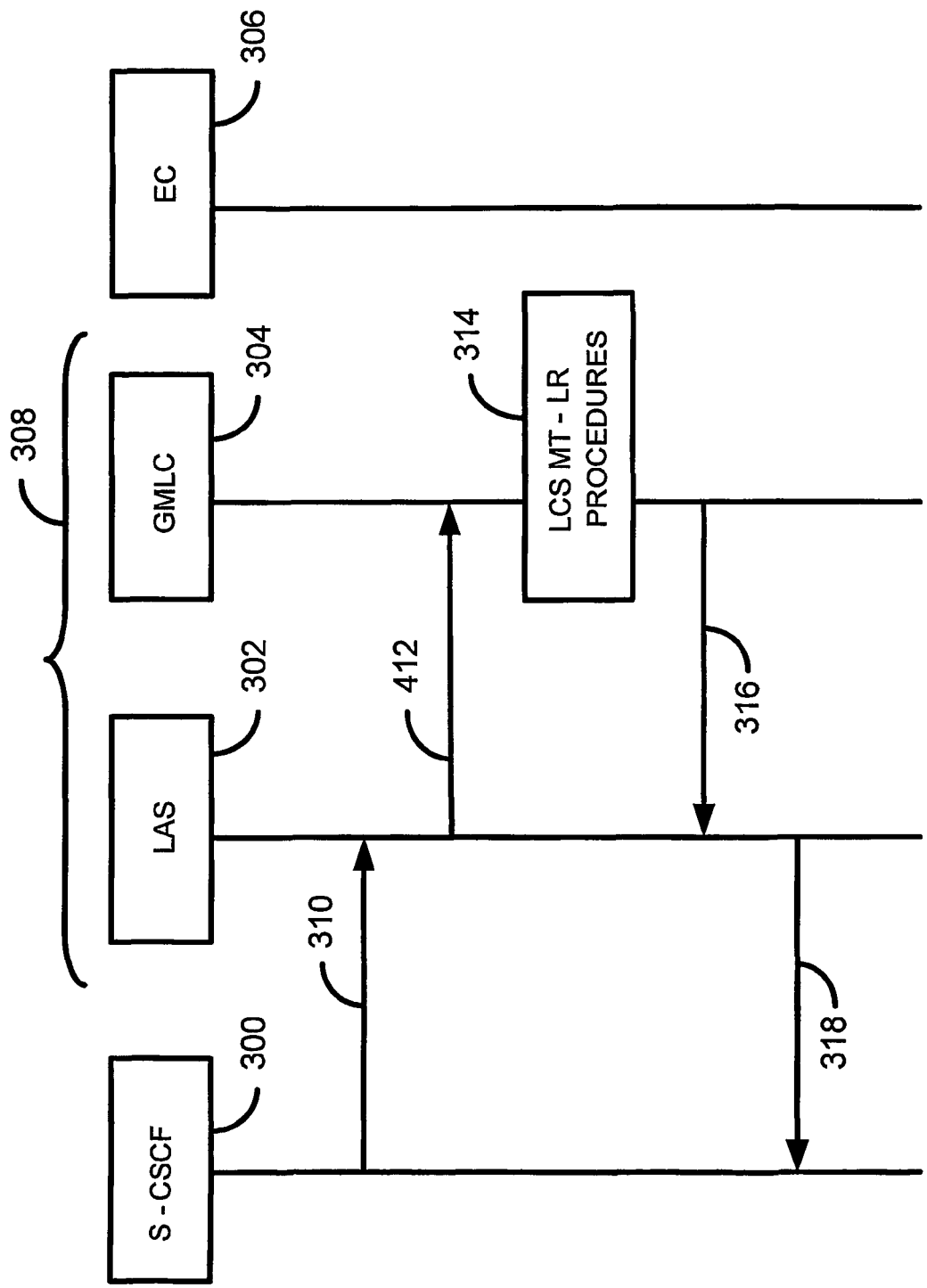
FIG. 3 displays a message flow diagram depicting a method of acquiring location information at session initiation.

FIG. 3 displays a message flow diagram depicting a method of acquiring location information at session initiation. The message flow diagram of FIG. 3 depicts message flow between S-CSCF 300, LAS 302, GMLC 304 and EC 306. During operation, a SIP INVITE request 310 is communicated from the S-CSCF 300 to the LAS 302. The LAS 302 sends a location request 312 to the GMLC 304. In one embodiment, the GMLC 304 is pre-configured and resides in the same network (e.g., home or visited network 308) as the LAS 304. In one embodiment, the location request includes the type of location (e.g., current location), the UE's public identity and the required quality of service (QoS), such as the accuracy, response time, etc.

Upon receipt of the Location Request 312, the GMLC 304 initiates Mobile Terminating Location Request (MT-LR) procedures as shown by 314 to obtain the UE's location. In one embodiment, the MT-LR procedures are implemented in accordance with the MT-LR procedures described in 3GPP TS 23.271 V6.7.0 (2004-03). The GMLC 304 returns the location information to the LAS 302 in a Location Response 316. The LAS 302 then includes the location information in a SIP INVITE request 318 to the S-CSCF 300. A variety of packet formats and messages may be used to implement the foregoing methods. For example, the Internet Protocol or the GSM MAP protocol may be used.

Figure 4:
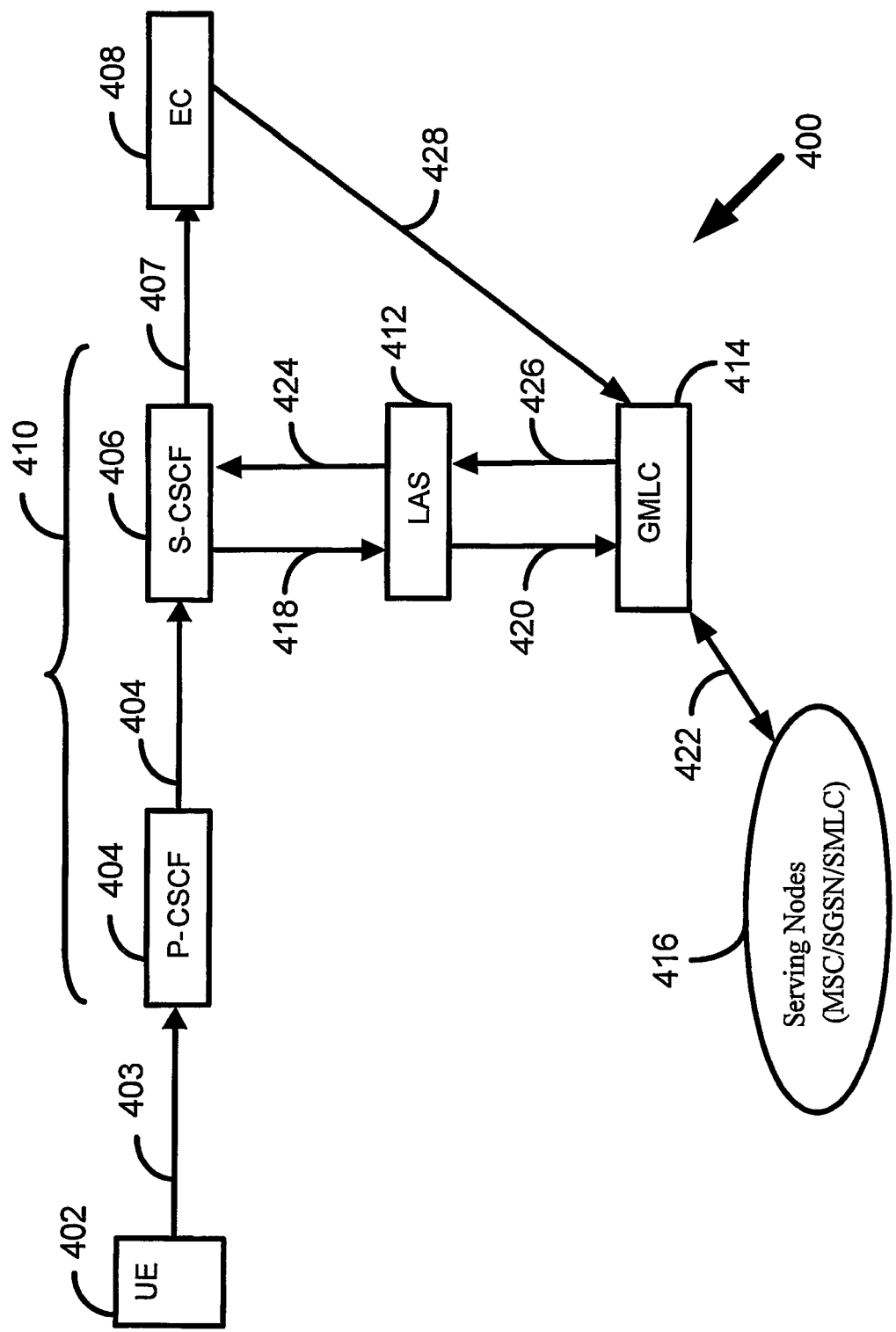
FIG. 4 displays a network implementing the method of acquiring location information after session initiation.

FIG. 4 displays a network implementing the method of acquiring location information after session initiation. A UE 402 communicates with a P-CSCF 404. The P-CSCF 404 is capable of communication with an S-CSCF 406. The S-CSCF 406 may communicate with the EC 408 and the LAS 412. In accordance with the teachings of the present invention, the LAS 412 is in communication with the GMLC 414 through an M1 interface. The GMLC 414 is ultimately in communication with serving nodes (MSC/SGSN/SMLC) 416.

During operation, an emergency INVITE request 403 is sent from the UE 402 to the P-CSCF 404. The P-CSCF 404 detects that the user is initiating an emergency call and forwards the emergency INVITE request 405 to a S-CSCF 406 in the same network. The P-CSCF 404 and the S-CSCF 406 will detect the user initiating an emergency call. There are a variety of method for doing this for example, the user may initiate a "special" INVITE message e.g. a SOS INVITE request or an INVITE with a new SIP Emergency header. In the first case, the CSCF on receipt of an SOS INVITE detects it is an emergency request. In the latter case, the CSCF will need to look in all INVITE requests for the Emergency header. It should be appreciated that a variety of alternative methods may be implemented and still remain within the scope of the present invention.

The S-CSCF 406 detects this is an emergency call and forwards the emergency INVITE request 418 to the LAS 412. A request for routing information 420 is sent from the LAS 412 to a GMLC 414 in the same network. The GMLC 414 sends an acknowledgement 426 to the LAS 412 with routing information and possibly the location information, if this can be obtained. The routing information enables the EC 408 to access the GMLC 414 in order to request the UE's 402 location information at a later time. The LAS 412 communicates an INVITE message 424 including the routing information and possibly the location information back to the S-CSCF 406. The S-CSCF 406 then communicates an INVITE message 407 to the EC 408. If the INVITE message does not contain the location information, then the EC 408 may then send a location request 428 to the GMLC 414.

At any time after the GMLC 414 receives a request for routing information 420, the GMLC 414 sends a Location Service (LCS) Mobile Terminal Location Request (MT-LR) 422 to the server nodes 416. The server nodes 416 communicate a response to the GMLC 414 (as shown by the two-directional arrow 422).

Figure 5:
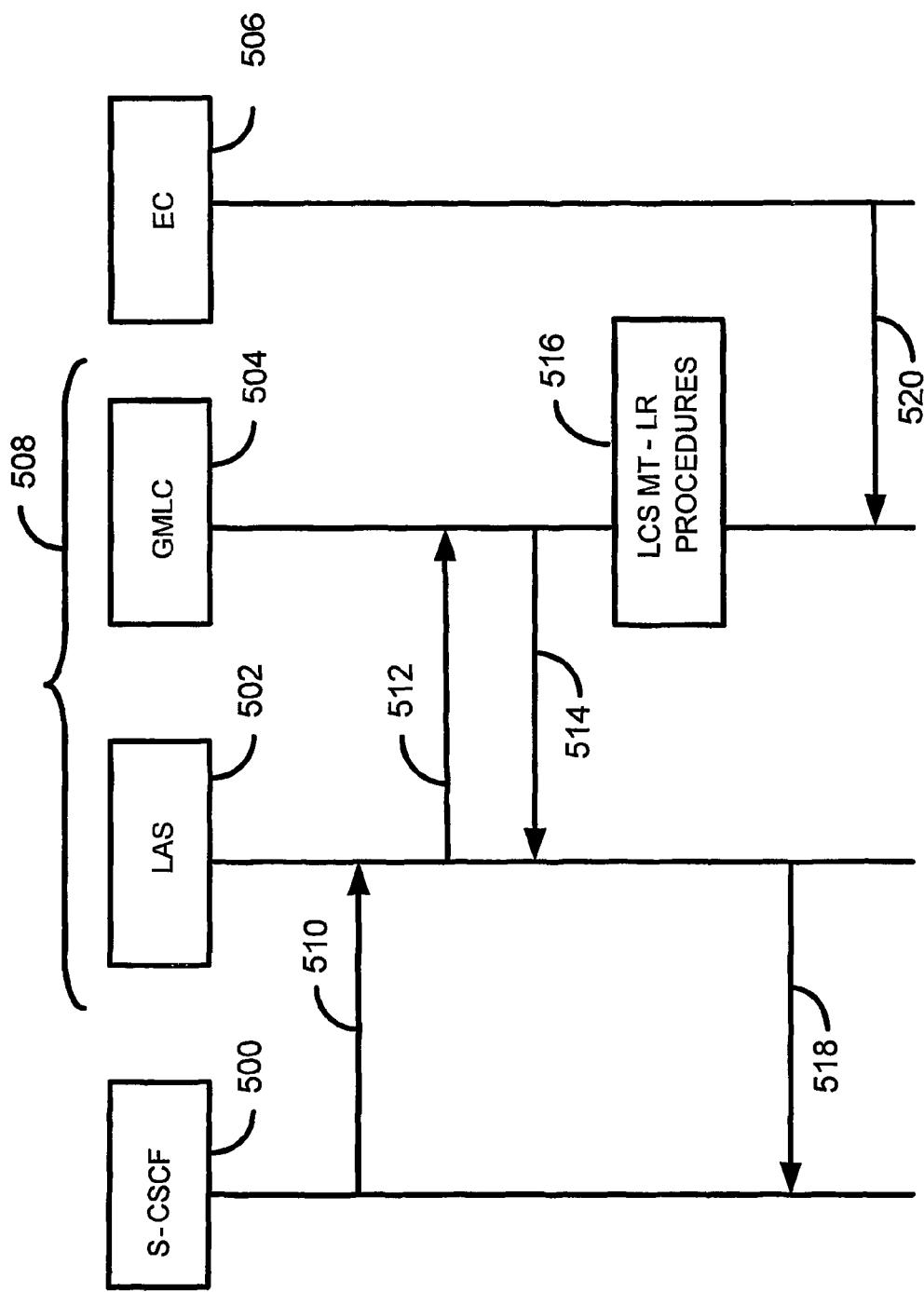
FIG. 5 displays a message flow diagram depicting a method of acquiring location information at session initiation.

FIG. 5 displays a message flow diagram depicting a method of acquiring location information after session initiation. The message flow diagram of FIG. 5 depicts the message flow between S-CSCF 500, LAS 502, GMLC 504 and EC 506. During operation, The S-CSCF 500 sends a SIP INVITE request 510 to the LAS 502. The LAS 502 sends a request for routing information 512 to a pre-configured GMLC 504 in the same network 508. In one embodiment, the request for routing information 512 includes the type of location (e.g. current location), the UE's public identity and required QoS (e.g. accuracy, response time).

The GMLC 504 sends a request for routing information acknowledgement 514, which includes routing information that will enable the EC 506 to request UE's (not shown in FIG. 5) location information at a later time (e.g. a routing key) and may include the UE location (if already/previously obtained). At any time after the request for routing information 512 is received, the GMLC 504 initiates the Mobile Terminating Location Request (MT-LR) procedures 516 as described in 3GPP TS 23.271 V6.7.0 (2004-03) to obtain the UE's location. The LAS 502 includes the routing information and possibly the location information provided in the request for routing information acknowledgement 514 in a SIP INVITE request 518 to the S-CSCF 500. The EC 506 requests location information 520 from the GMLC 504 upon receipt of the SIP INVITE that includes the routing information. A variety of packet formats and messages may be used to implement the foregoing methods. For example, the Internet Protocol or the GSM MAP protocol may be used.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of obtaining location information for emergency services during session initiation between mobile user equipment (UE) and an emergency center, the method comprising:

receiving at a location application server (LAS) a first request message from a call session control function (CSCF) server in response to the CSCF server receiving an emergency request message from user equipment (UE);

communicating a location request from the LAS to a mobile location center in response to receiving the first request message, the location request operable for initiating a mobile terminal location request (MT-LR) procedure within the mobile location center;

receiving a location response at the LAS from the mobile location center in response to communicating the location request to the mobile location center, the location response comprising location information of the UE; and communicating a second request message to the CSCF server in response to receiving the location response, the second request message including the location information of the UE.

2. A method of obtaining location information as set forth in claim 1, further comprising:

receiving the emergency request message from the UE at a proxy-CSCF (P-CSCF) server; and forwarding the emergency request message as the first request message from the P-CSCF server to the CSCF server, the CSCF server comprising a server-CSCF (S-CSCF) server.

3. A method of obtaining location information as set forth in claim 2, wherein the first request message is a Session Initiation Protocol INVITE request message and the second request message is a Session Initiation Protocol INVITE request message.

4. A method of obtaining location information as set forth in claim 1, further comprising:
receiving the emergency request message from the UE at a proxy-CSCF (P-CSCF) sever; and
generating at the P-CSCF server the first request message and sending the first request message from the P-CSCF server to the CSCF server, the CSCF comprising a server-CSCF (S-CSCF) server.

5. A method of obtaining location information as set forth in claim 1, wherein the first request message, is a Session Initiation Protocol INVITE request message and the second request message is a Session Initiation Protocol INVITE request message.

6. A method of obtaining location information as set forth in claim 1, further comprising:
obtaining the location information of UE using the MT-LR procedure within the mobile location center.

7. A communication system comprising:
a call session control function for receiving an emergency request message from user equipment (UE) and, in response thereto, generating a first request message;
a location application server communicatively coupled to the CSCF server for receiving the first request message and generating a location request;
a gateway server communicatively coupled to the location application server for receiving the location request and implementing a mobile terminal location request (MT-LR) procedure to obtain location information of the UE and for generating an acknowledgement response to the location application server, the acknowledgement response comprising the obtained location information of the UE; and
wherein the location application server is operable for receiving the acknowledgement response and for communicating a second request message to the CSCF server, the second request message including the obtained location information of the UE.

8. A communication system as set forth in claim 7, wherein the CSCF server comprises a proxy-CSCF (P-CSCF) server and a server-CSCF (S-CSCF) server, and wherein the emergency request message is received at the P-CSCF server a one of; forwarded to the S-CSCF server as the first request message or terminated with the S-CSCF server generating the first request message in response to receiving the emergency request message.

9. A communication system as set forth in claim 7, wherein the first request message is a Session Initiation Protocol INVITE request message and the second request message is a Session Initiation Protocol INVITE request message.

10. A method of obtaining location information for emergency services after session initiation between mobile user equipment (UE) and an emergency center, the method comprising:
receiving at a location application server (LAS) a first request message from a call session control function (CSCF) server in response to the CSCF server receiving an emergency request message from user equipment (UE);
communicating by the LAS to a mobile location center a request for routing information in response to receiving the first request message;
receiving at the LAS from the mobile location center a routing information acknowledgement in response to communicating the request for routing information to the mobile location center, the routing information acknowledgement comprising routing information associated with the UE enabling a request for location information of the UE;
communicating a second request message to the CSCF server in response to receiving the request for routing information acknowledgement, the second request message including the routing information associated with the UE;
communicating from the CSCF server the routing information to an emergency center; and
after receiving the routines information, requesting, by the emergency center, location information of the UE from the mobile location center.

11. A method of obtaining location information as set forth in claim 10 further comprising:
receiving the emergency request message from the UE at a proxy-CSCF (P-CSCF) server; and
generating at the P-CSCF server the first request message and sending the first request message from the P-CSCF server to the CSCF server, the CSCF server comprising a server-CSCF (S-CSCF) server.

12. A method of obtaining location information as set forth in claim 11, wherein the first request message is a Session Initiation Protocol INVITE request message and the second request message is a Session Initiation Protocol INVITE request message.

13. A method of obtaining location information as set forth in claim 10, wherein the first request message is a Session Initiation Protocol INVITE request message and the second request message is a Session Initiation Protocol INVITE request message.

14. A method of obtaining location information as set forth in claim 10, further comprising:
obtaining the location information of the UE using a mobile terminal location request (MT-LR) procedure within the mobile location center.

* * * * *